United States Patent [19]

McNulty

[11] Patent Number: 5,037,101

[45] Date of Patent: Aug. 6, 1991

[54] HOLOGRAM GAME CARD

[76] Inventor: James P. McNulty, 1079 Mechanics Valley Rd., Northeast, Md. 21901

[21] Appl. No.: 540,081

[22] Filed: Jun. 19, 1990

[51] Int. Cl.$^5$ .......................... A63F 3/06; B42D 15/00
[52] U.S. Cl. ...................................... 273/139; 283/86; 283/901; 283/903
[58] Field of Search ............. 273/138 R, 139; 283/86, 283/901, 903

[56] References Cited

U.S. PATENT DOCUMENTS

| | | | |
|---|---|---|---|
| 3,552,853 | 1/1971 | Sanders et al. | 283/86 X |
| 4,171,864 | 10/1971 | Jung et al. | 283/86 X |
| 4,501,439 | 2/1985 | Antes | 283/86 X |
| 4,740,016 | 4/1988 | Konecny et al. | 273/139 X |
| 4,747,620 | 5/1988 | Kay et al. | 283/86 |

Primary Examiner—William H. Grieb

[57] ABSTRACT

A hologram game card having a laminate of
(i) at least one hologram-containing layer containing at least one hologram,
(ii) a backing layer on which the hologram-containing layer(s) are mounted, and
(iii) a covering layer covering a side of the hologram-containing layer(s) opposite the backing layer, wherein
(a) the covering layer is opaque with respect to wavelengths of visible light usable to view the hologram(s) such that no image represented by the hologram(s) is viewable with the naked eye while the covering layer is present in an opaque state over the hologram(s),
(b) the covering layer is at least partially removable by scratching, rubbing or pulling off by hand to allow any image represented by the hologram(s) to be viewed with the naked eye or the covering layer can be treated to render it non-opaque thereby allowing any image represented by the hologram(s) to be viewed with the naked eye.

8 Claims, 2 Drawing Sheets

HOLOGRAM GAME CARD

BACKGROUND OF THE INVENTION

The invention involves hologram-containing laminates particularly useful as game cards, lottery cards or sweepstakes cards.

In the past, game cards such as lottery tickets contained printed matter which was printed onto a backing material or card. The printed matter on the card was then covered with a silk-screened ink or other removable material layer. The removable layer prevented reading of the printed matter located underneath until the layer was removed by scratching or rubbing it off. Another version of this type of game card was the pull tab type card wherein the printed matter was hidden by a covering layer that had a perforated section which could be torn off to allow the printed matter to be viewed.

A disadvantage of these known game cards is that the printed matter contained therein is often easily duplicated. This renders the game cards subject to easy counterfeiting. A further disadvantage of the known game cards is that the printed matter often provides very little visual impact on the player of the game when it is revealed. Thus, the marketing appeal and utility of these known cards is limited A hologram is a recorded interference pattern formed by laser light which is altered by the object to be depicted and a reference laser. This recorded interference pattern, when illuminated, refocuses the illuminating light and presents the refocused light to the viewer. The refocused light is substantially identical to the light that would have been seen if the object itself were present in the illuminating light.

Further, since the refocused light changes with the angle from which the interference pattern is viewed, the viewer is able to perceive the image in three dimensions as if the original object were present.

Another feature of holograms is that the portion of the image appearing to the viewer can change with the viewing angle. Thus, the viewer typically can see a part of the image that was previously obscured by changing his/her angle of view.

SUMMARY OF THE INVENTION

The present invention overcomes the disadvantages of the prior art game cards by using a hologram-containing laminate card. The game cards of the invention provide great visual appeal and stimulation while being very difficult to counterfeit.

In one embodiment, the invention encompasses a hologram game card having a laminate of (i) at least one hologram-containing layer containing at least one hologram,
(ii) a backing layer on which said hologram-containing layer(s) are mounted, and
(iii) a covering layer covering a side of said hologram-containing layer(s) opposite said backing layer, wherein
(a) said covering layer is opaque with respect to wavelengths of visible light usable to view said hologram(s) such that no image represented by said hologram(s) is viewable with the naked eye while said covering layer is present in an opaque state over said hologram(s),
(b) said covering layer is at least partially removable by scratching, rubbing or pulling off by hand to allow any image represented by said hologram(s) to be viewed with the naked eye or said covering layer can be treated to render it non-opaque thereby allowing any image represented by said hologram(s) to be viewed with the naked eye.

Preferably, the game card of the invention also has a transparent protective layer between the hologram(s) and the covering layer.

In a more specific embodiment, the invention embraces a pull tab type game card wherein the covering layer has a pull tab section covering said hologram(s). The pull tab section is at least partially bordered by perforations in the covering layer. The perforations allow the section to be selectively pulled off of the laminate to allow the hologram(s) to be viewed.

BRIEF DESCRIPTION OF THE DRAWINGS

FIG. 2b is an exploded view of the laminate of FIG. 2a.

DETAILED DESCRIPTION OF THE INVENTION

The invention will be described with respect to the drawings. While two specific methods of making the game card of the invention are discussed, it should be understood that the invention is not limited to a specific method of fabrication.

Figure 1:
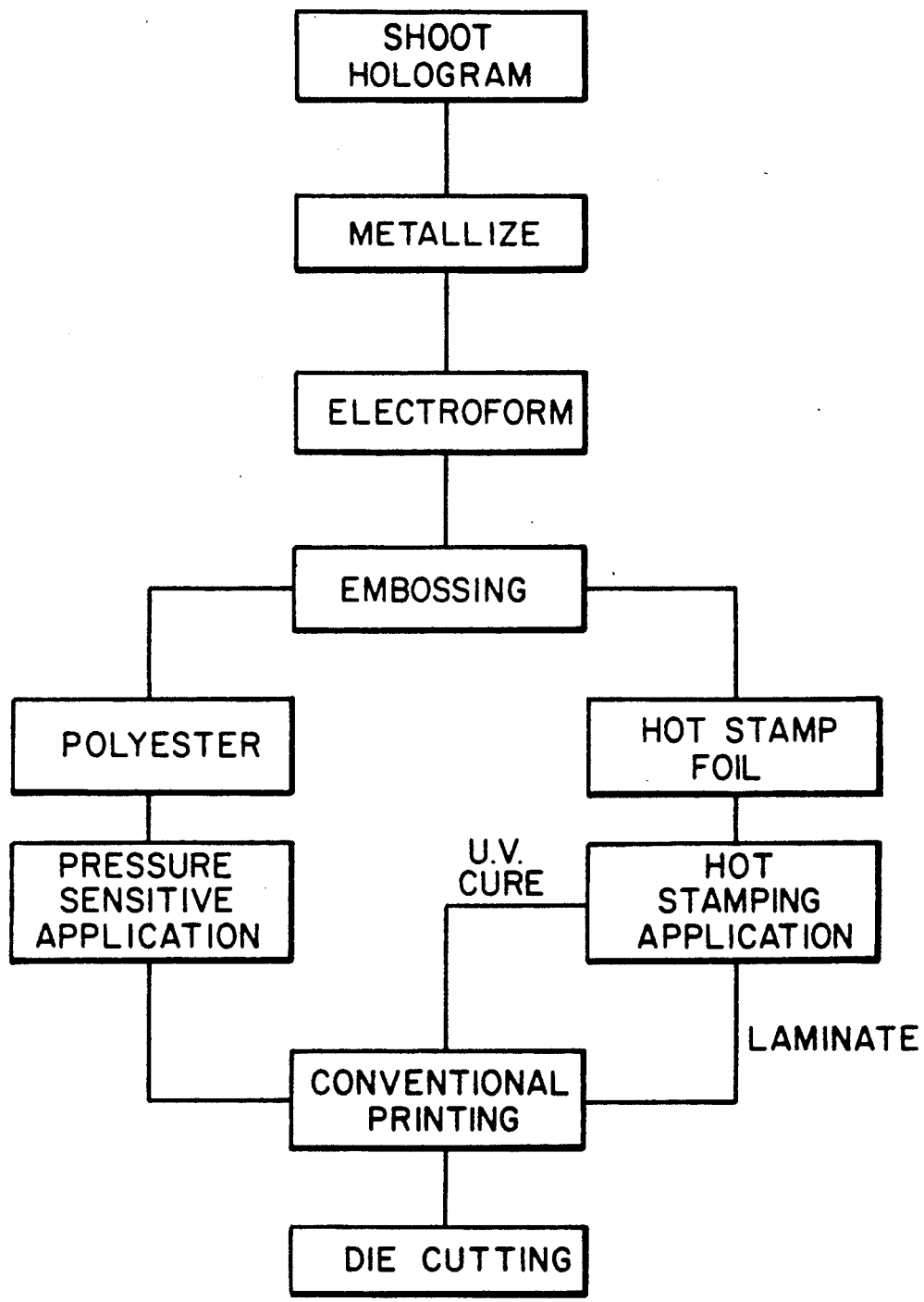
FIG. 1 is a flow chart showing possible sequences of steps for producing the game card of the invention.

Referring to FIG. 1, a hologram of the image or images to be shown in the game card is created using conventional laser holography techniques to record the interference pattern. One possible medium for recording this interference pattern is a glass sheet coated with a light sensitive material which deforms on exposure to the light forming the interference pattern to create a shape corresponding to the interference pattern.

The coated glass sheet containing the interference pattern is then metallized or covered with silver to render the pattern electrically conductive. This coating step can be done by vapor deposition.

A thick film of nickel is then built on the metallized pattern by electroforming. This nickel film is removed from the metallized pattern. The portion of the nickel contacting the metallized interference pattern assumes the negative of the shape of the interference pattern. In this way, this nickel film is used as a mold for reproducing the original interference pattern. In practical applications, several nickel molds of this type would be formed from the original silver-metallized pattern.

The nickel mold is used to emboss a metallized foil by conventional embossing techniques. Such metallized foils typically comprise a metal layer on a polyester substrate film.

Figure 2A:
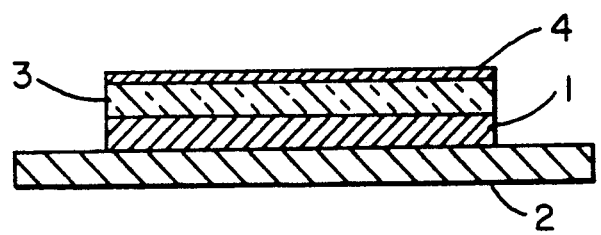
FIG. 2a is a cross section of a game card laminate of one embodiment of the invention.
Figure 2B:
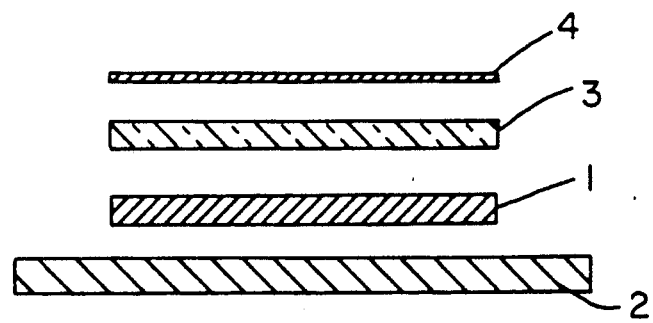

Referring to FIG. 2, the embossed foil 1 containing the hologram can then be adhered to a card stock backing layer 2 whereby the polyester substrate film acts as the transparent protective layer 3. The card stock backing layer 2 may have printed matter thereon in areas not covered by the embossed foil 1.

In an alternative embodiment, the polyester film is removed from the embossed foil. The embossed foil 1 containing the hologram can then be attached to a card stock backing layer 2 by conventional hot stamping techniques. The card containing the hot stamped hologram is then coated with a polymer material which is curable on exposure to ultraviolet light. The coated card is then treated with ultraviolet light to form transparent protective layer 3.

Alternatively, for the hot stamping embodiment, a different type of transparent protective layer 3 can be laminated over the embossed foil 1 so long as care is taken to preserve the holographic information contained in the embossed foil 1.

The card containing the embossed foil covered by the protective layer 3 is then covered with a covering layer 4. This step can be done by silk screening a water-soluble ink or other opaque material over protective layer 3.

In this case of a pull tab type card, the covering layer 4, containing the pull tab section(s) bordered by perforations, would be attached to the card so that the pull tab is situated above the hologram-containing portion of the embossed film 1.

If the cards are produced as a continuous strip, they could then be cut using a die cutter to produce the individual game cards.

The game cards of the invention can be used for lottery games, sweepstakes, point of sale promotions and the like. The game player would typically be instructed to remove at least a portion of the protective layer in order to find out whether he/she had won a prize or to reveal an image to be collected by the player in order to win the game.

While the invention has been described with reference to particular techniques of manufacture, the invention is not limited to any such particular technique. Further, while the invention has been described with respect to game cards that are substantially planar, it should be understood that the invention also encompasses embodiments wherein the card is not planar.

While it is generally preferred that the card employ a protective layer, the invention also encompasses embodiments wherein a separate protective layer is not used if the hologram does not happen to require such protection.

Further, the invention is not limited to the use of a single hologram image contained in a single hologram-containing layer, but rather the invention encompasses embodiments wherein a layer contains multiple holograms and/or wherein the laminate contains a multitude of hologram-containing layers.

Lastly, the card stock and protective layer used can also contain printed information.

I claim:

1. A hologram game card comprising a laminate of
   (i) at least one hologram-containing layer containing at least one hologram,
   (ii) a backing layer on which said hologram-containing layer(s) are mounted, and
   (iii) a covering layer covering a side of said hologram-containing layer(s) opposite said backing layer, wherein
   (a) said covering layer is opaque with respect to wavelengths of visible light usable to view said hologram(s) such that no image represented by said hologram(s) is viewable with the naked eye while said covering layer is present in an opaque state over said hologram(s),
   (b) said covering layer is at least partially removable by scratching, rubbing or pulling off by hand to allow any image represented by said hologram(s) to be viewed with the naked eye or said covering layer can be treated to render it non-opaque thereby allowing any image represented by said hologram(s) to be viewed with the naked eye.

2. The game card of claim 1 wherein said laminate contains (iv) a transparent protective layer between said hologram(s) and said covering layer.

3. The game card of claim 2 wherein said protective layer comprises polyester.

4. The game card of claim 2 wherein said protective layer is a polymer material curable by exposure to ultraviolet light.

5. The game card of claim 1 wherein said covering layer comprises a section covering said hologram(s), which section is at least partially bordered by perforations in said covering layer, said perforations allowing said section to be selectively pulled off of the laminate to allow the hologram(s) to be viewed.

6. The game card of claim 1 wherein said covering layer contains a water-soluble ink which can be rubbed or washed off to reveal said hologram(s).

7. The game card of claim 1 wherein said laminate is substantially planar.

8. A hologram game card comprising a laminate of
   (a) a backing layer,
   (b) a hologram-containing layer mounted on said backing layer,
   (c) a transparent protective layer mounted on said hologram-containing layer on a side opposite said backing layer, and
   (d) an opaque covering layer mounted on said transparent protective layer which covering layer is at least partially removable by hand to reveal said hologram allowing the hologram to be viewed by exposure to visible light.

* * * * *